United States Patent [19]
Storey et al.

[11] Patent Number: 5,518,269
[45] Date of Patent: *May 21, 1996

[54] INFLATABLE VEHICLE OCCUPANT RESTRAINT WITH DYNAMIC BURN VENTS

[75] Inventors: J. Kirk Storey, Farmington; Brent K. Olson, Clearfield; James R. Kaufmann, Salt Lake City; Brent R. Marchant, Ogden; Bradley D. Harris, Farmington, all of Utah

[73] Assignee: Morton International, Inc., Chicago, Ill.

[*] Notice: The term of this patent shall not extend beyond the expiration date of Pat. No. 5,478,111.

[21] Appl. No.: 399,322

[22] Filed: Mar. 6, 1995

Related U.S. Application Data

[63] Continuation-in-part of Ser. No. 105,230, Aug. 11, 1993, Pat. No. 5,478,111.

[51] Int. Cl.⁶ .................................................. B60R 21/30
[52] U.S. Cl. ........................................ 280/739; 280/743.1
[58] Field of Search ............................. 280/728.1, 731, 280/739, 743.1

[56] References Cited

U.S. PATENT DOCUMENTS

| | | | |
|---|---|---|---|
| 3,451,693 | 6/1969 | Carey | 280/739 |
| 3,511,519 | 5/1970 | Martin | 280/739 |
| 3,527,475 | 9/1970 | Carey et al. | 280/739 |
| 3,831,972 | 8/1974 | Allgaier et al. | 280/730.1 |
| 3,892,425 | 7/1975 | Sakairi et al. | 280/743.1 |
| 3,937,488 | 2/1976 | Wilson et al. | 280/736 |
| 4,097,065 | 6/1978 | Okada et al. | 280/743.1 |
| 4,805,930 | 2/1989 | Takada | 280/739 |
| 5,016,913 | 5/1991 | Nakajima et al. | 280/738 |
| 5,056,815 | 10/1991 | Geisreiter | 280/736 |
| 5,073,418 | 12/1991 | Thornton et al. | 280/743.1 |
| 5,131,434 | 7/1992 | Krummheuer et al. | 280/743.1 |
| 5,178,408 | 1/1993 | Barrenchen et al. | 280/743.1 |
| 5,219,179 | 6/1993 | Eyrainer et al. | 280/739 |
| 5,333,903 | 8/1994 | Eyrainer et al. | 280/743.2 |
| 5,370,925 | 12/1994 | Koseki | 280/728.1 |
| 5,388,860 | 2/1995 | Brede et al. | 280/739 |

FOREIGN PATENT DOCUMENTS

| | | |
|---|---|---|
| 0536677 | 5/1992 | European Pat. Off. . |
| 0529371 | 7/1992 | European Pat. Off. . |
| 0495410 | 10/1992 | European Pat. Off. . |
| 0495409 | 10/1992 | European Pat. Off. . |
| 5-16751 | 1/1993 | Japan ............................ 280/730.2 |
| 9009908 | 7/1990 | WIPO . |

*Primary Examiner*—Paul N. Dickson
*Attorney, Agent, or Firm*—Nick C. Kottis; Gerald K. White

[57] ABSTRACT

An inflatable vehicle occupant restraint having a dynamic burn vent wherethrough inflation gas can be appropriately vented therefrom. Such an inflatable vehicle occupant restraint has particular application for side impact restraint systems wherein increased venting by the dynamic vents occurs subsequent to full deployment of the inflatable restraint.

20 Claims, 4 Drawing Sheets

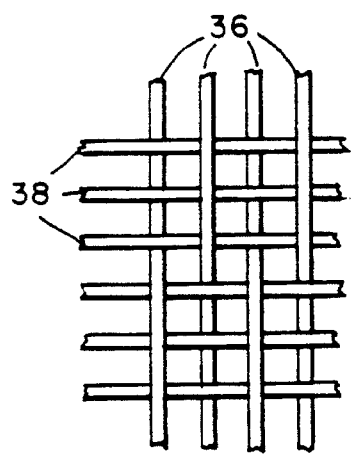
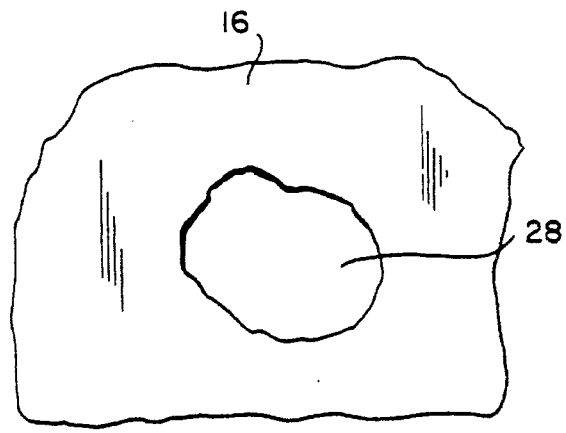
FIG. 4
FIG. 5
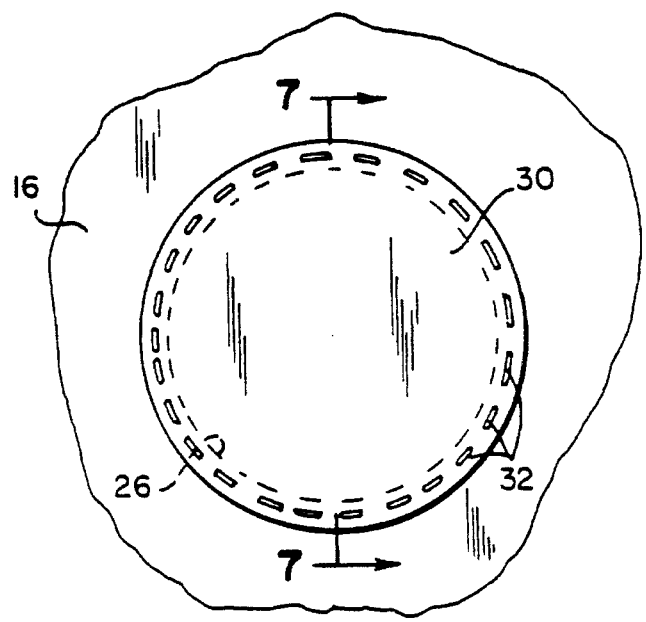
FIG. 6
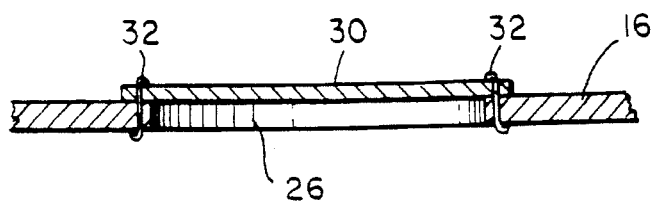
FIG. 7

INFLATABLE VEHICLE OCCUPANT RESTRAINT WITH DYNAMIC BURN VENTS

CROSS REFERENCE TO RELATED APPLICATION

This application is a continuation-in-part application of application, U.S. Ser. No. 08/105,230, filed on Aug. 11, 1993 now U.S. Pat. No. 5,478,111. The co-pending parent application is hereby incorporated by reference herein and is made a part hereof, including but not limited to those portions which specifically appear hereinafter.

BACKGROUND OF THE INVENTION

This invention relates generally to inflatable-type modular occupant restraint systems for passenger vehicles. Such restraint are commonly know as air bags and may be installed in an automobile or other vehicle, at least in part on the steering wheel or adjacent to the driver for the protection of the driver and also in the dashboard or adjacent to an occupant for passenger protection in the event of a collision. More particularly, this invention relates to an improved means for controlling the discharge rate of gas from an air bag cushion and for preventing the over-pressurization of the air bag cushion.

Inflatable restraint systems for restraining the movement of occupants of a motor vehicle during a collision have long been known. The inflatable occupant restraint is located in close proximity to the occupant and is normally stowed in an uninflated condition. In the event of a crash, however, the inflatable occupant restraint is commonly designed to inflate with a gas in no more than a few milliseconds.

The inflation gas is normally produced or generated in or from a device referred to as a "gas generator" or, as it is more commonly known, an "inflator." In one common type of inflator, inflation gas is produced upon the ignition and burning of a gas generant material. The pressure of combustion gases resulting from the rapid burning of the gas generant material causes gas to rush into the bag to effect a rapid rate of inflation thereof.

An air bag cushion, which is normally made from a material that may be substantially impermeable to the flow of gas, typically is provided in part thereof with at least one vent port which serves as an outlet for gas contained within the air bag cushion. Alternatively, the air bag cushion may be provided in part thereof with a permeable fabric which functions as an outlet for gas contained within the cushion. The vent port or permeable fabric for typical operating conditions relieves excess pressure from within the air bag cushion to prevent the cushion from bursting and to prevent recoil of an occupant who impacts onto an over-pressurized air bag cushion. Increased venting to provide additional pressure relief for the air bag cushion may be desired in situations such as when: 1) the gas generating material of an inflator is more reactive due to being stored at a high temperature, e.g., such as being stored in a vehicle exposed to bright sunlight; 2) the vehicle is involved in a high-energy collision; or 3) when a relatively large occupant is to be subject to the action of the air bag cushion.

Prior solutions to the need for increased venting have used rupturable patches, seams or the like which break and open an exhaust vent to relieve excess pressure from within the air bag cushion. Such solutions are disclosed in Eyrainer et al., U.S. Pat. No. 5,219,179; Takada, U.S. Pat. No. 4,805,930; Okada et al., U.S. Pat. No. 4,097,065; Nakajima et al., U.S. Pat. No. 5,016,913; and Carey et al., U.S. Pat. No. 3,527,475.

As disclosed by Takada, stitched seams between fabric elements of an air bag cushion induce localized distension when the air bag cushion is exposed to excess pressure. The air bag cushion opens along the seams causing the film coating of the envelope fabric to rupture along the seams. This allows gas to escape and maintain a substantially constant overall maximum pressure, regardless of variation in ambient temperature.

In Okada, the air bag gas vent is covered with a gas-permeable cloth which is provided with at least one dart. When the dart tears, it provides a bulge-out portion to relieve pressure within the air bag cushion to prevent the cushion from bursting.

Heat-shrink material which partially blocks a gas vent is disclosed by Nakajima. The shrink-wrap shrinks to increase the area for the passage of gas from the air bag cushion when gas is introduced into the air bag cushion from the inflator.

A patch covering a gas vent is disclosed in Carey. The patch is made from material which has less strength than the material from which the air bag cushion is made. The patch is attached to the cushion with adhesive or similar means. When the air bag cushion is over-pressurized, the patch ruptures along the periphery of the gas vent forming a flap which moves to permit gas to exhaust from the air bag cushion.

In addition, there is a growing need and desire to employ inflatable restraints to provide protection to a vehicle occupant in the case where the vehicle is the subject of a side impact or collision. Side impact inflatable restraints, however, can present special demands or requirements on the inflatable restraint system.

For example, it is common for a side impact inflatable restraint to be stowed in positions (e.g., such as about the pillar beams of the vehicle or within the seat back cushion or door frame) that are in closer proximity to the occupant which is to be protected thereby, as compared to typical frontal impact inflatable restraints. Such closer storage typically will result in a reduction of the already short time interval between actuation of the inflatable restraint system and contact by the occupant with the inflated restraint. Thus, rapid inflation and proper venting are special concerns relative to side impact applications of inflatable restraints.

SUMMARY OF THE INVENTION

A general object of the invention is to provide an improved inflatable vehicle occupant restraint.

A more specific objective of the invention is to overcome one or more of the problems described above.

Another object of the invention is to provide a secondary pressure relief means for an air bag cushion.

Still another object of the invention is to provide a section of the air bag cushion which will give way gradually when exposed to higher temperature gases to open a vent in the air bag cushion in a step-by-step manner.

Yet another object of the invention is to provide a vent the forming of which is delayed until the air bag cushion is deployed in a position to accept the impact from an occupant of the vehicle.

Another object of the invention is to provide a gas exhaust means which is substantially impermeable to gas under normal air bag cushion deployment conditions, but which gas exhaust means can be made permeable to gas under high pressure conditions while not degrading the overall integrity of the air bag cushion.

These and other objectives of the invention, which will become apparent from the following description, have been achieved by a novel safety air bag cushion for use in passenger vehicles, which air bag cushion is provided with at least one dynamic vent which forms a variable porosity zone. A dynamic vent can cover a discrete vent or the dynamic vent may be formed into the material of the air bag cushion. The latter may be continuous to and may be formed from the same piece of material as the air bag cushion. The dynamic vent is slightly permeable to the generated gas in the air bag cushion below a critical pressure. The dynamic vent opens at a pressure above the critical pressure by the increased flow of gas through the dynamic vent resulting in the melting of the fabric from which the dynamic vent is made.

The air bag cushion for use with this invention is inflated by a gas under pressure such as provided from an inflator. The air bag cushion comprises a foldable body comprising a first portion, a second portion, and a third portion. The air bag cushion first portion is disposed opposite an occupant of the vehicle when the air bag cushion is inflated. The first portion is made of a cloth that is substantially impermeable to gas. The second portion is attached to the first portion and terminates in a third portion which defines a gas inlet opening of the air bag cushion. The dynamic vent is formed into the fabric of the air bag cushion second portion.

The dynamic vent can be made by forming micropores into the fabric of the air bag cushion second portion. Also, the dynamic vent can be formed into fabric which is used to cover an existing discrete vent. The micropores may be cut into the fabric with a laser or needle punch. Also, the dynamic vent can be created by special weaving of the fabric.

The invention also comprehends an inflatable vehicle occupant restraint having at least one vent hole formed therein with a vent hole cover material in covering relation with the vent hole. The inflatable restraint is fabricated of a substantially gas impermeable material and is inflated by the flow of a hot gas under pressure. The vent hole cover material is of a fabric which is only slightly permeable to the hot gas at a pressure below a critical pressure, thereby initially minimizing the amount of hot gas vented through the one vent hole, and wherein the flow of the hot gas through the vent hole cover material causes the fabric to melt permitting an increased amount of the hot gas to vent through the vent hole.

The invention further comprehends a side impact inflatable vehicle occupant restraint having at least one vent hole formed therein and having a vent hole cover material in covering relation with each such vent hole. The side impact inflatable restraint is fabricated of a substantially gas impermeable material and inflated by the flow of a hot gas under pressure. The vent hole cover material is of a fabric which is only slightly permeable to the hot gas at a pressure below a critical pressure, thereby initially minimizing the amount of hot gas vented through the one vent hole, and wherein the flow of the hot gas through the vent hole cover material causes the fabric to melt permitting an increased amount of the hot gas to vent through the vent hole.

The invention further comprehends a side impact inflatable vehicle occupant restraint having at least one vent hole with a vent hole cover material in covering relation with each such vent hole to form the primary pressure relief means of the side impact inflatable restraint. The side impact inflatable restraint is fabricated of a substantially gas impermeable material and inflated by the flow of a hot gas under pressure. The vent hole cover material is of a fabric which is only slightly permeable to the hot gas at a pressure below a critical pressure, thereby initially minimizing the amount of hot gas vented through the one vent hole and wherein the flow of the hot gas through the vent hole cover material causes the fabric to melt permitting an increased amount of the hot gas to vent through the vent hole.

BRIEF DESCRIPTION OF THE DRAWINGS

FIG. 4 is a top plan view illustrating a dynamic vent formed by a three-over-one weave.

FIG. 5 is a fragmented view of an air bag cushion having a dynamic vent which has burned through illustrating the venting feature of this invention.

FIG. 6 is a top view of a dynamic vent in covering relation to a discrete vent, which is referred to as a covered vent.

FIG. 7 is a cross-sectional view taken along line 7—7 of FIG. 6 illustrating a dynamic vent in covering relation to a discrete vent.

DETAILED DESCRIPTION OF THE INVENTION

Figure 1:
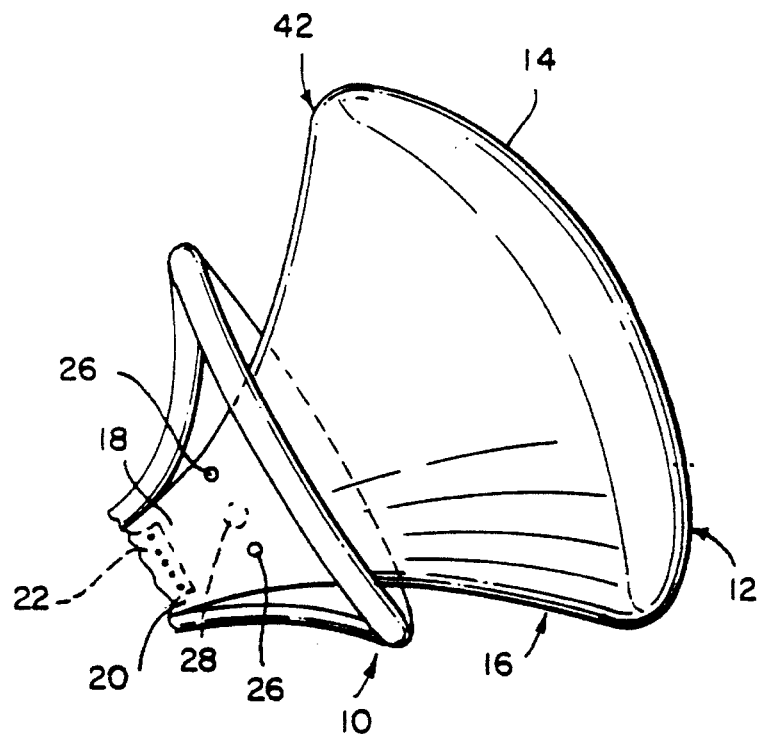
FIG. 1 is a side plan view illustrating a typical driver side air bag cushion in a deployed condition.
Figure 2:
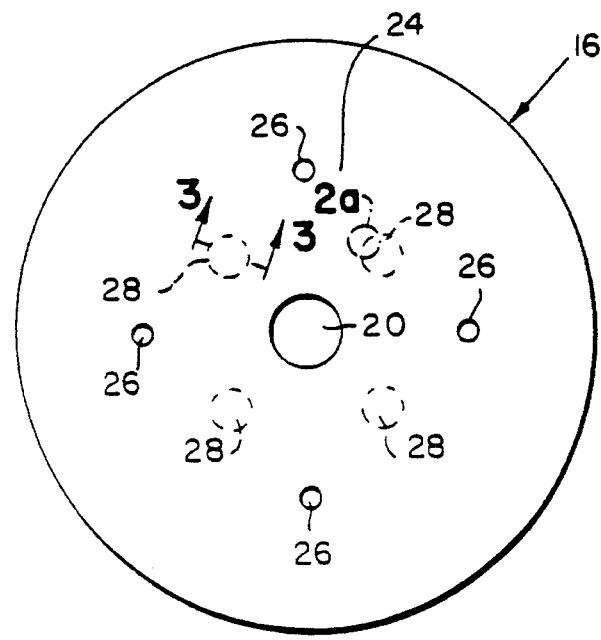
FIG. 2 is a back plan view showing the back portion of the air bag cushion including a dynamic vent.

As best seen in FIG. 1, an air bag cushion module is shown generally at 10 with an automotive air bag cushion 12 in a deployed condition. The air bag cushion 12 includes a first portion 14, a second portion 16, and a third portion 18 defining a gas inlet opening 20 (as shown in FIG. 2) that is provided for receiving a gas for inflation of the air bag cushion 12 provided by an inflator 22. As shown in FIG. 2, the second portion 16 of the air bag cushion 12 comprises a fabric portion 24 with a gas inlet opening 20 provided generally in the central region of the second portion 16 and may include at least one discrete vent port 26 located radially outward of the gas inlet opening 20. The second portion 16 also contains at least one dynamic vent 28 formed into the fabric or covering a discrete vent port 26 (as shown in FIGS. 6 and 7) of the air bag cushion second portion 16 with a dynamic vent patch 30 attached to the air bag cushion second portion 16 by stitch 32.

The dynamic vent 28 comprises a section of fabric within the fabric of the air bag cushion second portion 16 which is slightly permeable to generated gas at normal operating pressures. By slightly permeable is meant herein, a fabric having a porosity of from about 200 to about 500 cfm/ft$^2$ at a pressure of one-half inch of water. At a critical pressure which is above normal operating pressures, the flow of generated gas through the dynamic vent 28 at normal operating temperatures results in the melting and/or burning of the fabric of the dynamic vent 28 causing the dynamic vent 28 to open as shown in FIG. 5. The melting of the fabric of the dynamic vent 28 can be accomplished by reducing the strength or increasing the porosity of the dynamic vent 28 thereby making the fabric susceptible to degradation by melting.

Figure 3:
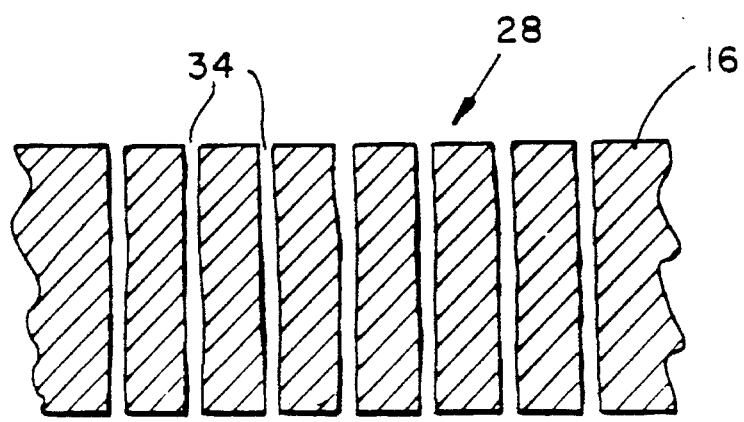
FIG. 3 is a cross-sectional view taken along line 3—3 of FIG. 2 illustrating micropores.

The strength of the fabric from which the dynamic vent 28 is made can be reduced by creating microholes or micropores 34 in the fabric, as shown in FIG. 3. Micropores 34 are used to make impermeable fabric slightly permeable in localized areas, by adjusting micropore 34 size and spacing. The presence of the micropores 34 makes the fabric of the dynamic vent 28 more susceptible to degradation by high temperature gases such that the dynamic vent 28 will burn through when exposed to generated gas at pressures above critical pressures. The burned through dynamic vent 28 shown in FIG. 5 provides additional exhaust vents through which the generated gas can exit the air bag cushion 12, thus relieving pressure from within the air bag cushion 12.

Micropores 34 can be formed in the fabric of the air bag cushion second portion 16 by using a number of manufacturing techniques known in the textile industry. For example, but not limited to, the micropores 34 can be formed in the fabric by laser energy. A laser is used to place a number of micropores 34 in the fabric. Also, micropores 34 can be formed in the fabric from which the dynamic vent 28 is made by means of a needle punch. The micropores 34 formed by laser or needle punch are such that the fabric is still substantially impermeable as defined herein.

Further, the strength of the fabric from which the dynamic vent 28 is made can be reduced by specialized weaving of the material from which the air bag cushion 12 is made. For example, fabric is normally woven by a first thread passing over a second thread, and perpendicular to the second thread, then under a third thread, over a fourth thread, and so on. This is referred to herein as an one-over-one weave. The one-over-one weave would normally provide the strongest material. To weaken the fabric slightly a different weave may be used. For example, as shown in FIG. 4, a thread 36 (hereinafter "first thread") may be passed over and perpendicular to three adjacent threads 38 (hereinafter "second threads"). The thread 36 is then passed under and perpendicular to the next three threads, then over and perpendicular to the subsequent three threads, and so on. This one-over-three weave produces a weaker fabric. Should the first thread 36 break or burn through, the second threads 38 would be free to move from side to side thus forming gaps through which gas could pass thereby increasing the burning rate of adjacent threads. A one-over-three weave is presented herein as an example. However, other weave patterns such as, but not limited to, a one-over-two weave, a one-over-four weave, a two-over-three weave, or a two-over-four weave may be used.

To aid in the burn through, the thread material employed as the "first thread" 36 can be thinner than that used for the "second thread" 38. In addition, a less heat resistant thread material can be used as the first thread 36. For example, the first thread 36 may be formed from nylon 6, glass, vinyl coated fiberglass, or polyester, while the second thread 38 may be formed from nylon 66.

Alternatively, the strength of the fabric in the area defined by the dynamic vent 28 may be reduced by decreasing the number of threads per inch relative to the overall air bag cushion 12. For example, but not limited to, while the air bag cushion 12 is normally formed from fabric having 50 threads per inch, the fabric of the dynamic vent 28 could be formed by fabric having 40 threads per inch. This would reduce the strength of the dynamic vent 28 by about 20% compared to the fabric of the overall air bag cushion 12. Also, thinner thread could be used to form the fabric from which the dynamic vent 28 is made.

The dynamic vent 28 formed into the fabric of the air bag cushion second portion 16 or as a dynamic vent patch 30 in covering relation to a discrete vent 26, as shown in FIGS. 6 and 7, may be formed by any of the aforementioned methods.

Figure 2A:
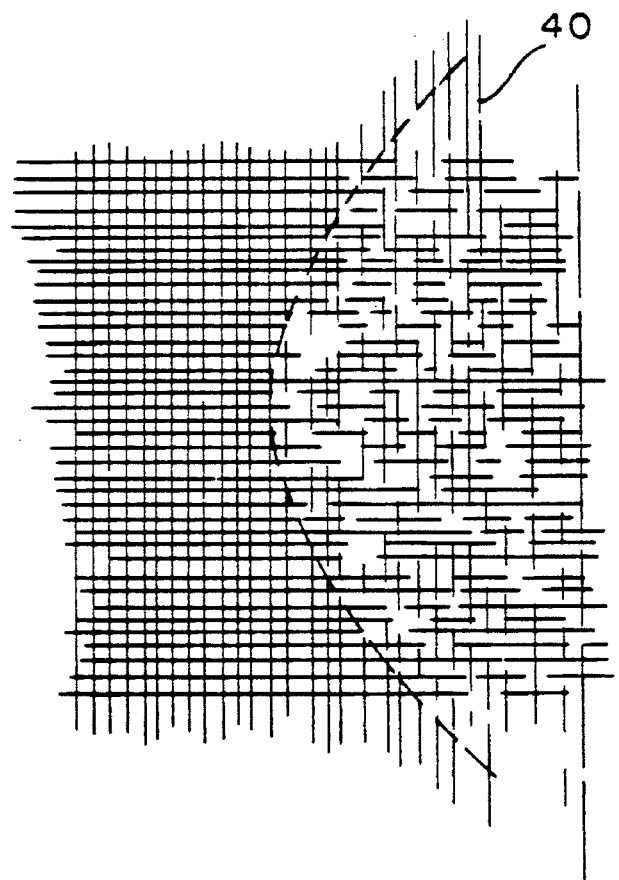
FIG. 2a is an enlarged view taken from section 2a of FIG. 2 illustrating the difference between the fabric of the air bag cushion and the fabric of the dynamic vent and showing one form of micropores.

It is believed that gas at normal operating temperatures and pressures above the critical pressure will result in a gas flow which will cause the threads 40, as shown in FIG. 2a, of the fabric from which the dynamic vent 28 is made to melt and disintegrate. As threads 40 disintegrate, the volumetric flow rate of the gas through the dynamic vent 28 increases further thereby causing disintegration of more threads 40. This cycle continues until the dynamic vent 28 has burned through as shown in FIG. 5.

The dynamic vent of this invention can be used with any air bag cushion 12 known in the art, either a driver side air bag cushion 12 or a passenger side air bag cushion. The air bag cushion may be made from glass, fiberglass, nylon 66, nylon 6, vinyl coated fiberglass, or polyester. In one embodiment, the dynamic vent 28 is located in close proximity to the air bag cushion third portion 18, preferably no more than one-third of the distance along the air bag cushion second portion 16 between the third portion 18 and the section of the maximum radius 42, as shown in FIG. 1, of the air bag cushion 12 occurs. More preferably, the dynamic vent 28 should be located no more than one-fourth of the distance along the air bag cushion second portion 16 between the third portion 18 and the section of maximum radius 42. If the dynamic vent 28 is located in close proximity (from about 2 inches to about 6 inches) to the gas inlet opening 20, the dynamic vent 28 may preferably be designed such that it does not burn through before the air bag cushion 12 is fully deployed, e.g., from about 40 to about 70 milliseconds after the collision of the vehicle with another object. Also, in driver side applications the dynamic vent can preferably be placed on that section of the air bag cushion second portion 16 located between the instrument panel and the steering wheel in order to avoid possible injury to the driver due to direct contact with exhaust gases.

The dynamic vent 28 of this invention can be used with any inflator 22 known in the art. The inflator 22 can be any of a number of known constructions, including the construction illustrated in commonly assigned U.S. Pat. No. 4,296,084 to Schneiter.

The automotive air bag cushion 12 with the dynamic vent 28 of this invention may be stored in the steering wheel or adjacent to a driver for the protection of the driver, and also in the dashboard, the passenger side instrument panel, or adjacent to a passenger for passenger protection in the event of a collision. A signal from a crash sensor triggers the generation of gas by the inflator 22. Normally, as pressure builds within the expanding air bag a portion of the gas is exhausted through the vent holes of the air bag. As the collision proceeds, an occupant of the vehicle impacts onto the air bag cushion, resulting in additional gas being discharged through exhaust vents. When the air bag module 10 has been stored at elevated temperatures the gas generated by the gas generant exits the inflator 22 at a slightly higher temperature. The increased temperature of the gas in combination with the increased pressure forces gas through the normal exhaust vents and through the fabric of the dynamic vent 28. In accordance with a particular alternative preferred embodiment, the fabric of the dynamic vent 28 can be designed to burn through under these conditions. As the fabric of the dynamic vent 28 burns through, the flow rate of the higher temperature gas accelerates the degradation of the fabric in the variable porosity zone. As the degradation of the fabric is completed, an additional vent or vents are formed to exhaust gas from the air bag cushion 12, thus permitting the pressure within the air bag cushion 12 to be reduced.

Similarly, during a high-energy collision the impact of an occupant against the air bag cushion 12 caused heated gas to be forced through the fabric of the dynamic vent 28, thereby initiating the burn-through process. In a process similar that discussed in the preceding paragraph, the fabric of the dynamic vent 28 burns through thus creating additional exhaust vents in the air bag cushion 12 to relieve excess pressure within the air bag cushion 12.

Thus, in accordance with the invention, there has been provided a secondary pressure relief means for an air bag cushion. There has also been provided a section of the air bag cushion which will give way gradually when exposed to higher temperature gases to open a vent in the air bag cushion in a step-by-step manner. There has also been provided a gas exhaust means which is substantially impermeable to gas under normal air bag cushion deployment conditions, but which exhaust means can be made permeable to gas under high pressure conditions while not degrading the overall integrity of the air bag cushion.

Figure 8:
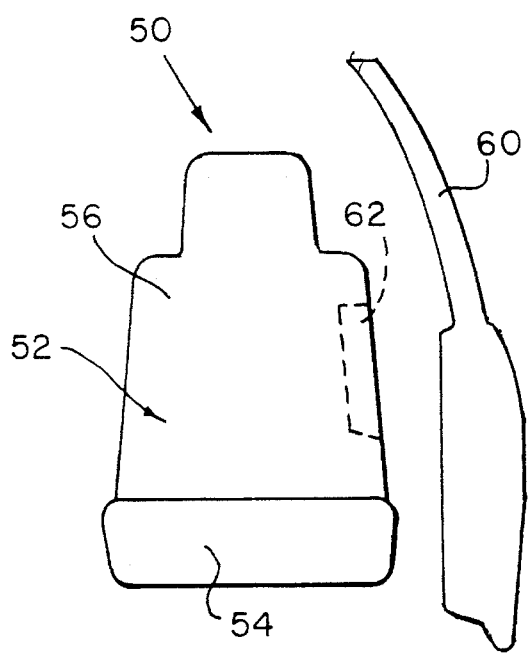
FIG. 8 is a simplified fragmentary front plan view of a vehicle interior showing a side impact inflatable restraint mounting.
Figure 9:
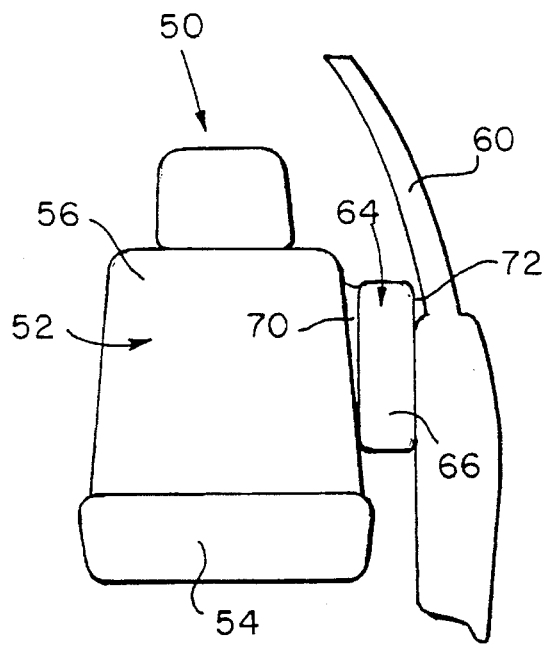
FIGS. 9 and 10 are simplified fragmentary front and side plan views, respectively, of the vehicle interior of FIG. 8 showing the side impact inflatable restraint in a deployed state.
Figure 10:
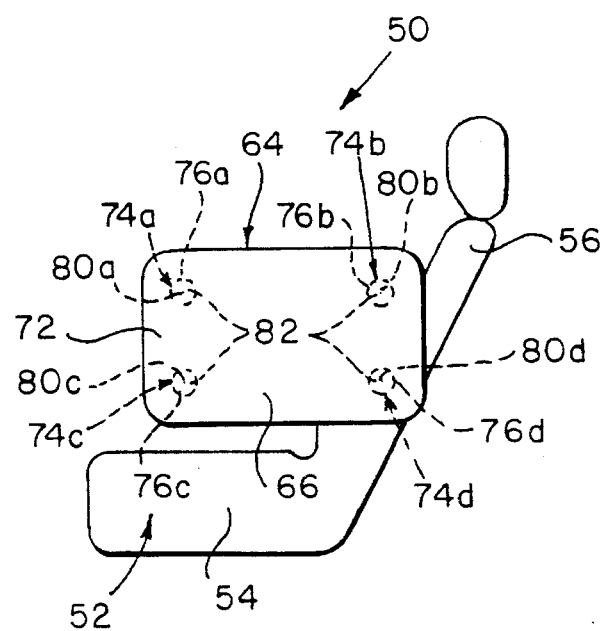

Referring now to FIGS. 8–10, there is illustrated a vehicle interior, generally designated by the reference numeral 50, in accordance with one embodiment of the invention. The vehicle interior 50 includes an occupant seat 52 having a seat bench 54 and a seat back 56, with the occupant seat 52 adjacent a vehicle door 60 (for ease of illustration and comprehension, not shown in the view of FIG. 10). As shown in FIG. 8, a side impact inflatable restraint module 62 is stored within the seat back 56.

As shown in FIGS. 9 and 10, upon actuation, a side impact inflatable restraint 64, such as stored within the side impact inflatable restraint module 62, is deployed to provide protection to a vehicle occupant (not shown) such as seated in the occupant seat 52. For example, the deployed side impact restraint 64 may serve to minimize or prevent undesired contact by an occupant with the vehicle door 60.

The side impact inflatable restraint 64, as described above, is fabricated of a substantially gas impermeable material 66. For example, the substantially gas impermeable material can be a fabric that is substantially gas impermeable material or a fabric that is treated or coated such as to be rendered as substantially gas impermeable, as described above.

The side impact inflatable restraint 64 includes an occupant adjacent front panel 70 and an opposed back panel 72. The back panel 72 includes four dynamic vents 74a, 74b, 74c, and 74d, respectively, similar to those described above, formed in the substantially gas impermeable material 66. Each of the dynamic vents 74a, 74b, 74c, and 74d is composed of a vent hole 76a, 76b, 76c, and 76d, respectively, with a vent hole covering material 80a, 80b, 80c, and 80d, respectively, in covering relationship thereto.

As described relative to the above-identified embodiments, such a vent hole covering material 80(a–d) is generally in the nature of a fabric 82 which is only slightly permeable to generated hot gas at normal operating pressures. Further as described above, at a critical pressure which is above normal operating pressures, the flow of the hot gas through the dynamic vents 74(a–d) at normal operating temperatures results in the melting and/or burning of the dynamic vent fabric material 82 causing the dynamic vents 74(a–d) to open, such as was previously shown and described relative to FIG. 5, for example.

In order to provide the rapid inflation of the inflatable restraint particularly desired in certain applications, such as for side impact inflatable restraints such as illustrated, for example, the dynamic vents 74(a–d) are desirably the primary or principle pressure relief means provided in the inflatable restraint. By "primary" or "principle pressure relief means" what is meant is that such means provides at least about 50% and generally at least about 80% of the total pressure relief provided for in the inflatable restraint, as compared to a similar cushion without such dynamic vents. In particular, such dynamic vents desirably begin venting an increased amount of the hot gas at some time after full deployment of the inflatable restraint, where "full deployment" constitutes the inflatable restraint having achieved proper placement and positive pressure. In this way, little or none of the inflation gas is vented prior to the inflatable restraint having been deployed, and thereby desirably resulting in a faster deployment of the inflatable restraint. In addition, in order for the inflatable restraint to preferably provide the desired cushioning effect, such venting of an increased amount of the hot gas begins prior to contact with the inflatable restraint by a vehicle occupant protected by such inflatable restraint. As a result, the vents are preferably sufficiently opened, prior to significant loading onto the inflatable restraint by the occupant, that the deployed inflatable restraint is "softened", e.g., no longer fully inflated, at the time of such loading.

It will be appreciated that the number and/or location or placement of the dynamic vents can be altered or varied as desired or needed in particular applications.

For example, relative to the above-described embodiment, should the placement of the dynamic vents on the back panel be found to result, in some particular application, in gas flow therethrough being blocked or obstructed as a result of the adjacent vehicle door, the vents can be relocated such as onto the front panel or other appropriate location for that particular application.

The foregoing detailed description is given for clearness of understanding only, and no unnecessary limitations are to be understood therefrom, as modifications within the scope of the invention will be obvious to those skilled in the art.

For example, relative to the above-described embodiment of a side impact inflatable restraint, it is to be appreciated that the storage location for the inflatable restraint module and the inflatable restraint housed therein can be appropriately altered, as desired. Thus, rather than being stored within the seat, the inflatable restraint can be stored in or about a pillar beam of the vehicle or within door frame, for example.

What is claimed is:

1. An inflatable vehicle occupant restraint fabricated of substantially gas impermeable material and which inflatable restraint is inflated by the flow of a hot gas under pressure, said inflatable restraint comprising:

at least one vent hole formed in the substantially gas impermeable material with a vent hole cover material in covering relation to said at least one vent hole, said vent hole cover material comprising a fabric which is only slightly permeable to the hot gas at a pressure below a critical pressure, thereby initially minimizing the amount of hot gas vented through said at least one vent hole and wherein the flow of the hot gas through said vent hole cover material causes the fabric to melt permitting an increased amount of the hot gas to vent through said at least one vent hole.

2. The inflatable vehicle occupant restraint of claim 1 wherein the substantially gas impermeable material of said inflatable restraint comprises glass, fiberglass, nylon 66, nylon 6, vinyl coated fiberglass, or polyester.

3. The inflatable vehicle occupant restraint of claim 1 wherein the fabric of said vent hole cover material is formed by a one-over-three weave.

4. The inflatable vehicle occupant restraint of claim 1 wherein said at least one vent hole is made by forming micropores in the substantially gas impermeable material.

5. The inflatable vehicle occupant restraint of claim 4 wherein said micropores are made with a laser.

6. The inflatable vehicle occupant restraint of claim 1 wherein the substantially gas impermeable material of which the inflatable restraint is formed has 50 threads per inch and the fabric from which the vent hole cover material is made has 40 threads per inch.

7. The inflatable vehicle occupant restraint of claim 1 comprising a plurality of vent holes and wherein each of the plurality of said vent holes has a said vent hole cover material in covering relation thereto.

8. The inflatable vehicle occupant restraint of claim 1 comprising, in an inflated condition, an occupant adjacent front panel and an opposed back panel wherein said at least one vent hole is present.

9. The inflatable vehicle occupant restraint of claim 1 wherein the increased amount of the hot gas venting through said at least one vent hole vents therethrough only after full deployment of said inflatable restraint.

10. The inflatable vehicle occupant restraint of claim 9 wherein said at least one vent hole begins venting the increased amount of the hot gas prior to contact of said inflatable restraint by an occupant protected by said inflatable restraint.

11. The inflatable vehicle occupant restraint of claim 10 wherein said at least one vent hole covered with said vent hole cover material comprises the primary pressure relief means of said inflatable restraint.

12. The inflatable vehicle occupant restraint of claim 1 wherein said at least one vent hole covered with said vent hole cover material comprises the primary pressure relief means of said inflatable restraint.

13. A side impact inflatable vehicle occupant restraint, said side impact inflatable restraint being fabricated of a substantially gas impermeable material and which side impact inflatable restraint is inflated by the flow of a hot gas under pressure, said side impact inflatable restraint comprising:

at least one vent hole formed in the substantially gas impermeable material and having a vent hole cover material in covering relation with said at least one vent hole, said vent hole cover material comprising a fabric which is only slightly permeable to the hot gas at a pressure below a critical pressure, thereby initially minimizing the amount of hot gas vented through said at least one vent hole and wherein the flow of the hot gas through said vent hole cover material causes the fabric to melt permitting an increased amount of the hot gas to vent through said at least one vent hole.

14. The side impact inflatable vehicle occupant restraint of claim 13 wherein the increased amount of the hot gas venting through said at least one vent hole vents therethrough only after full deployment of said side impact inflatable restraint.

15. The side impact inflatable vehicle occupant restraint of claim 14 wherein said at least one vent hole begins venting the increased amount of the hot gas prior to contact of said side impact inflatable restraint by an occupant protected by said side impact inflatable restraint.

16. The side impact inflatable vehicle occupant restraint of claim 13 wherein said at least one vent hole covered with said vent hole cover material comprises the primary pressure relief means of said side impact inflatable restraint.

17. The side impact inflatable vehicle occupant restraint of claim 13 comprising a plurality of vent holes and wherein each of the plurality of said vent holes has a said vent hole cover material in covering relation thereto.

18. A side impact inflatable vehicle occupant restraint, said side impact inflatable restraint being fabricated of a substantially gas impermeable material and which side impact inflatable restraint is inflated by the flow of a hot gas under pressure, said side impact inflatable restraint comprising:

at least one vent hole formed in the substantially gas impermeable material and having a vent hole cover material in covering relation with said at least one hole to form the primary pressure relief means of said side impact inflatable restraint, said vent hole cover material comprising a fabric which is only slightly permeable to the hot gas at a pressure below a critical pressure, thereby initially minimizing the amount of hot gas vented through said at least one vent hole and wherein, after full deployment of said side impact inflatable restraint, the flow of the hot gas through said vent hole cover material causes the fabric to melt permitting an increased amount of the hot gas to vent through said at least one vent hole prior to contact with said side impact inflatable restraint by an occupant protected by said side impact inflatable restraint.

19. The side impact inflatable vehicle occupant restraint of claim 18 comprising a plurality of vent holes and wherein each of the plurality of said vent holes has a said vent hole cover material in covering relation thereto.

20. The side impact inflatable vehicle occupant restraint of claim 18 comprising, in an inflated condition, an occupant adjacent front panel and an opposed back panel wherein said at least one vent hole is present.

* * * * *